(12) United States Patent
Hirotani et al.

(10) Patent No.: US 7,393,047 B2
(45) Date of Patent: Jul. 1, 2008

(54) AUTOMOBILE ROOF STRUCTURE

(75) Inventors: Yasunari Hirotani, Fuchu-cho (JP);
 Katsumi Sakane, Fuchu-cho (JP);
 Shingo Kunihiro, Fuchu-cho (JP);
 Kazuhiro Tanaka, Fuchu-cho (JP);
 Asami Iwamoto, Fuchu-cho (JP);
 Masaki Nakaura, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 40 days.

(21) Appl. No.: 11/417,184

(22) Filed: May 4, 2006

(65) Prior Publication Data

US 2006/0255627 A1 Nov. 16, 2006

(30) Foreign Application Priority Data

May 12, 2005 (JP) ............................. 2005-140155
May 18, 2005 (JP) ............................. 2005-145250
May 23, 2005 (JP) ............................. 2005-149775

(51) Int. Cl.
 *B60J 3/02* (2006.01)
(52) U.S. Cl. .................... 296/214; 296/215; 296/216.08
(58) Field of Classification Search ................ 296/214, 296/216.06–216.09, 215
 See application file for complete search history.

(56) References Cited

U.S. PATENT DOCUMENTS

| | | | | |
|---|---|---|---|---|
| 3,016,263 | A | * | 1/1962 | Rehmann ............... 296/216.04 |
| 4,626,023 | A | | 12/1986 | Lutz |
| 5,005,899 | A | * | 4/1991 | Clenet ......................... 296/214 |
| 5,540,478 | A | * | 7/1996 | Schuch ......................... 296/210 |
| 5,995,272 | A | | 11/1999 | Paetz |
| 6,189,960 | B1 | | 2/2001 | Mumura et al. |
| 6,343,831 | B1 | * | 2/2002 | Nabert et al. .......... 296/187.05 |

(Continued)

FOREIGN PATENT DOCUMENTS

DE 35 27 541 2/1987

(Continued)

OTHER PUBLICATIONS

European Office Action, dated Aug. 4, 2006, in related European Patent Application No. 06009671.6-2423.

*Primary Examiner*—Dennis H Pedder

(57) ABSTRACT

Disclosed is an automobile roof structure, which comprises a pair of right and left roof side rails 1, a transparent roof panel 4 attached to cover a space between the roof side rails 1, a sun shade 5 disposed slidably along a bottom surface of the transparent roof panel 4, and a shade support member 6 for supporting the sun shade 5 in a slidingly movable manner. Each of the roof side rails 1 includes a rail outer panel 7 and a rail inner panel 8 formed, respectively, with roof flanges 14, 15 which are oriented to protrude in a laterally inward direction of an automobile body and joined together. The roof flanges 14, 15, a lateral peripheral portion of the transparent roof panel 4, and the shade support member 6, are disposed within a given positioning zone where they overlap each other in top plan view. The opposite lateral peripheral portion of the transparent roof panel 4 is fixed onto an upper surface of the roof flange 14 of the rail outer panel 7, and the shade support member 6 is fixed to a wall of the rail inner panel 8 at a position outward of the automobile body relative to the roof flange 14 of the rail outer panel 7.

4 Claims, 13 Drawing Sheets

U.S. PATENT DOCUMENTS

| | | |
|---|---|---|
| 7,144,076 B2 * | 12/2006 | Wendler et al. ............. 296/210 |
| 2004/0075304 A1 * | 4/2004 | Cocaign ..................... 296/214 |
| 2005/0189794 A1 * | 9/2005 | Grimm et al. ............... 296/214 |

FOREIGN PATENT DOCUMENTS

| | | |
|---|---|---|
| DE | 41 11 931 | 5/1992 |
| DE | 199 43 243 | 4/2001 |
| EP | 1 258 379 | 11/2002 |

* cited by examiner

AUTOMOBILE ROOF STRUCTURE

BACKGROUND OF THE INVENTION

1. Field of the Invention

The present invention relates to an automobile roof structure which includes a pair of right and left roof side rails, a transparent roof panel attached to cover a space between the roof side rails, a sun shade disposed slidably along a bottom surface of the transparent roof panel, and a shade support member for supporting the sun shade in a slidingly movable manner.

2. Description of the Related Art

Heretofore, there has been known a panoramic roof structure intended to increase a light-transmittable area in a roof portion of an automobile body by extending a glass roof panel continuous with a front windshield attached at the front of a passenger compartment, to the vicinity of a center pillar located at each of opposite lateral sides of the automobile body, as disclosed in EP Publication No. 1405744 A1 (Patent Publication 1), or by attaching a roof panel made of a transparent glass material or a transparent plastic material, to cover the entire roof portion of the automobile body, as disclosed in Japanese Patent Laid-Open Publication No. 2002-104240 (Patent Publication 2).

While the roof structure designed to attach a transparent roof panel to a roof portion of an automobile body, as disclosed in the Patent Publications 1 and 2, has an advantage of being able to increase a light-transmittable area of the roof portion in a frontward/rearward or longitudinal direction of the automobile body so as to effectively provide enhanced open feeling in an passenger compartment, it involves technical difficulty in stably supporting the transparent roof panel by the automobile body. Moreover, the roof structure is required to have a sun shade designed to be slidably attached below the transparent roof panel so as to selectably shield light from the roof portion, for example, when sunshine is too strong.

For example, in the automobile roof structure disclosed in the Patent Publication 2, a frame-shaped inner shell has a lateral frame region consisting of an upper frame member and a lower frame member. The upper frame member having a hollow-chamber-defining portion therein is adhesively fixed onto an upper surface of a roof side rail extending longitudinally along a lateral edge of the automobile body, and a lateral peripheral portion of the glass roof panel is fixed onto the upper frame member. The lower frame member is formed to cover a space between an inward edge of the upper frame member and a lower edge of the roof side rail. The inward edge of the upper frame member is formed to protrude inward of the automobile body relative to the roof side rail. A guide rail is incorporated in the inward edge of the upper frame member, and a sun shade (shade or sunblind) is supported by the guide rail in a slidingly movable manner. As needed, the sun shade can be pulled out of a take-up reel disposed on the rear side of the roof portion to cover a bottom surface of the transparent roof panel so as to shield sunlight.

In the above roof structure where the lateral peripheral portion of the glass roof panel is fixed onto the lateral frame region which consists of the upper frame member having the inward edge protruding inward of the automobile body relative to the roof side rail and the lower frame member formed to cover the space between the inward edge of the upper frame member and the lower edge of the roof side rail, an light-transmittable area of the roof portion is inevitably narrowed in a width or lateral direction of the automobile body, due to the lateral frame regions existing between opposite lateral peripheral portions of the glass roof panel or between opposite side door openings, and an open feeling in the passenger compartment will be undesirably spoiled.

SUMMARY OF THE INVENTION

In view of this problem, it is an object of the present invention to provide an automobile roof structure capable of effectively increasing a light-transmittable area of a roof portion in a lateral direction of an automobile body to provide excellent open feeling.

In order to achieve the above object, the present invention provides an automobile roof structure which comprises: a pair of right and left roof side rails each having a rail outer panel and a rail inner panel which are combined together to define a closed section extending in a longitudinal direction of an automobile body; a transparent roof panel attached to cover a space between the roof side rails; a sun shade disposed below a bottom surface of the transparent roof panel; and a shade support member for supporting the sun shade in a slidingly movable manner. In this automobile roof structure, the rail outer panel and the rail inner panel in each of the roof side rails are formed, respectively, with first and second roof flanges which are oriented to protrude in a laterally inward direction of the automobile body and joined together. Further, the first and second roof flanges, a corresponding one of opposite lateral peripheral portions of the transparent roof panel, and the shade support member, are disposed within a given positioning zone where they overlap each other in top plan view.

According to the present invention, the respective roof flanges of the rail outer panel and the rail inner panel, the lateral peripheral portion of the transparent roof panel, and the shade support member, are disposed to overlap each other in top plan view. This makes it possible to prevent occurrence of narrowed upward visibility which would otherwise be caused when the shade support member is disposed inward of the automobile body relative to the roof flanges, so as to increase a light-transmittable area of a roof portion in the lateral direction of the automobile body to effectively provide enhanced open feeling in a passenger compartment.

These and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
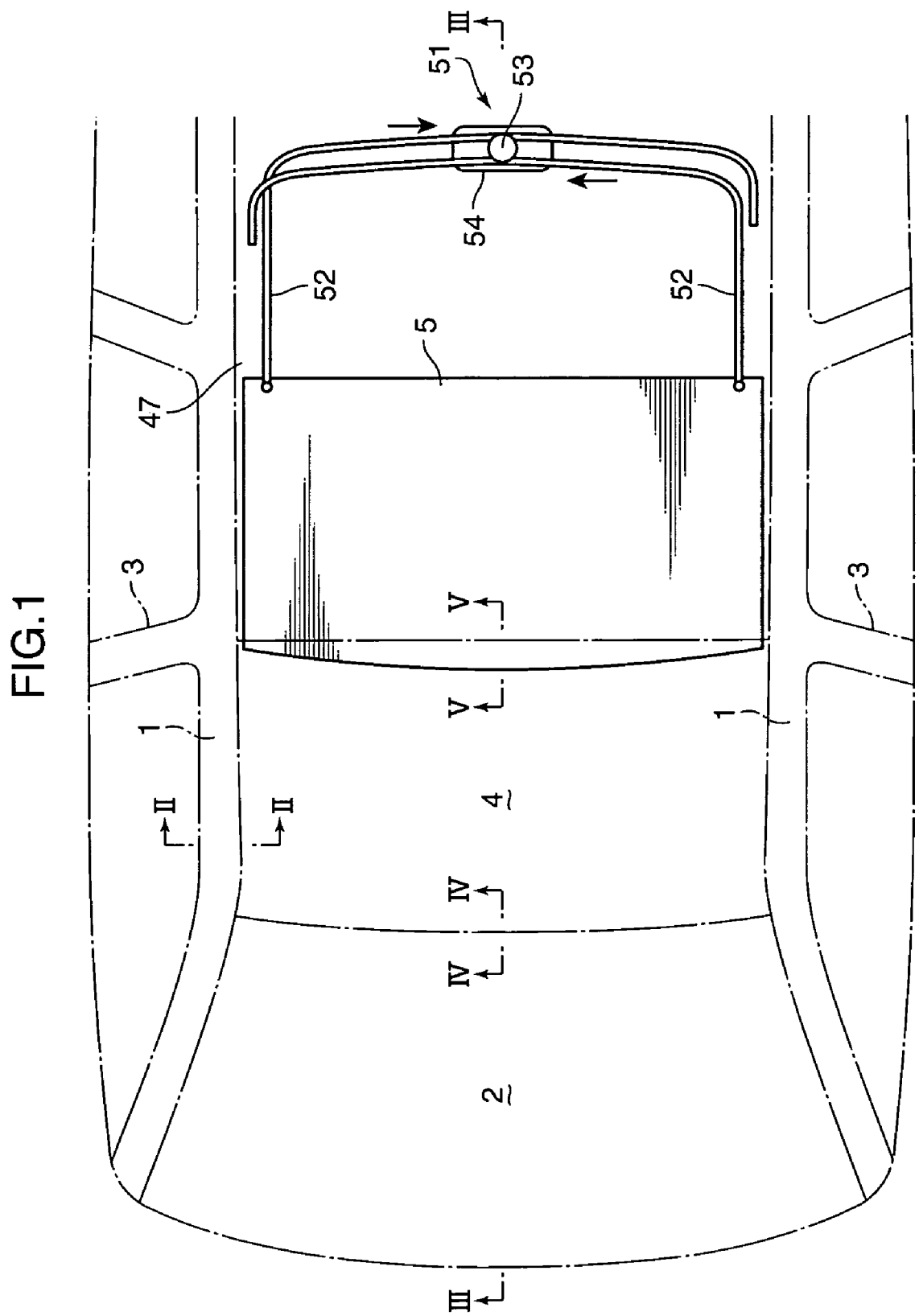
FIG. 1 is a top plan view showing an automobile roof structure according to a first embodiment of the present invention.
Figure 2:
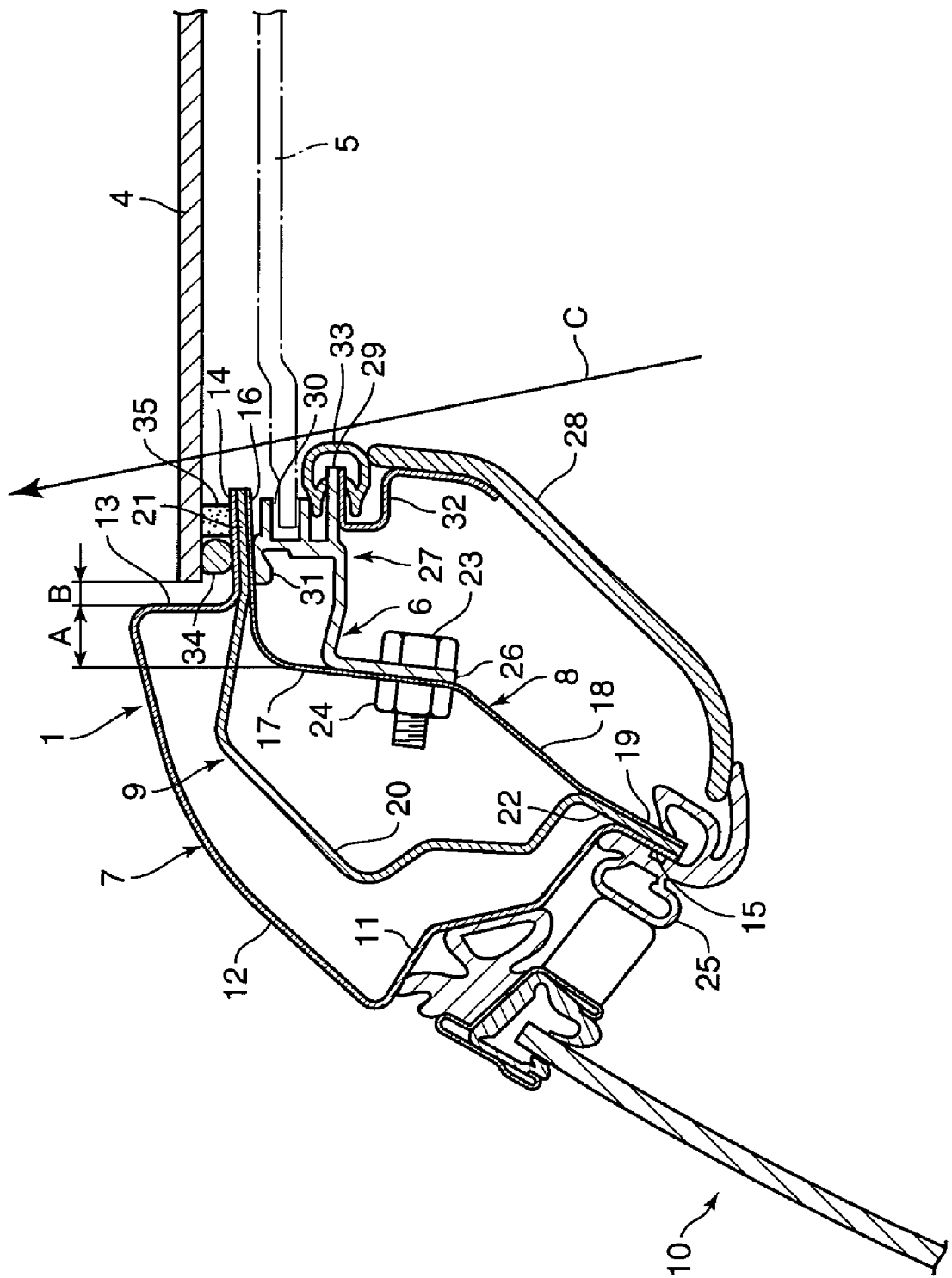
FIG. 2 is a sectional view taken along the line II-II in FIG. 1.
Figure 3:
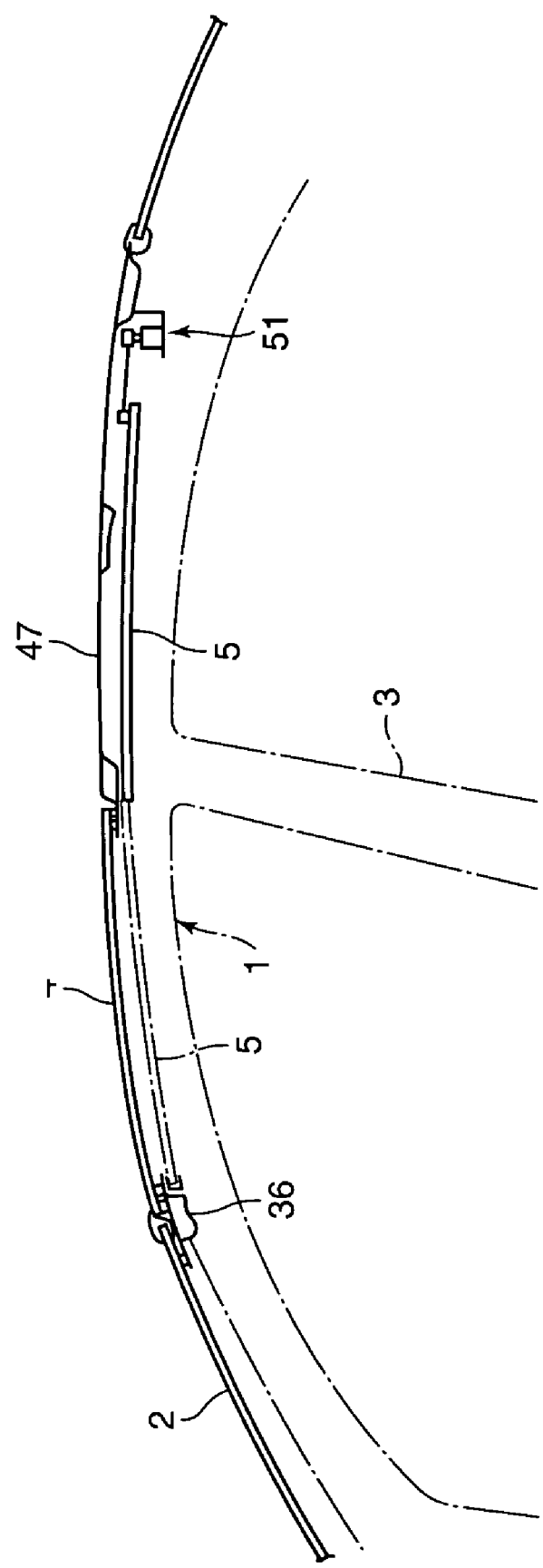
FIG. 3 is a sectional view taken along the line III-III in FIG. 1.

FIGS. 1 to 3 show an automobile roof structure according to a first embodiment of the present invention. This automobile roof structure comprises a pair of right and left roof side rails 1 extending, respectively, along right and left lateral edges of a roof portion of an automobile body in a frontward/rearward or longitudinal direction of the automobile body, a transparent roof panel 4 made of a transparent glass material or a transparent plastic material and attached to cover a space between the roof side rails 1 in a longitudinal range extending from an upper edge of a front windshield 2 to a line connecting between a pair of center pillars 3, a sun shade 5 formed of an opaque plastic panel or sheet member and disposed slidingly along a bottom surface of the transparent roof panel, and a shade support member 6 for supporting an lateral edge of the sun shade 5 in a slidingly movable manner.

As shown in FIG. 2, each of the roof side rails 1 includes a rail outer panel 7 and a rail inner panel 8 which are combined together to define a closed section extending in the longitudinal direction of the automobile body, and a rail rain reinforcement 9 disposed between the rail outer panel 7 and the rail inner panel 8 to divide the closed section into two sections consisting of an outward section and an inward section.

The rail outer panel 7 has a door-facing wall 11 extending along an upper edge of a side door 10, an arc-shaped wall 13 extending obliquely upward from an outward edge of the door-facing wall 11, a vertical wall 13 extending downward from an inward edge of the arc-shaped wall 12, a roof flange 14 protruding from an lower edge of the vertical wall 13 in a laterally inward direction of the automobile body, and a door flange 15 protruding from an inward edge of the door-facing wall 11 toward an opening of the automobile body for the side door 10.

The rail inner panel 8 has a roof flange 16 protruding in the laterally inward direction of the automobile body in opposed relation to the roof flange 14 of the rail outer panel 7, a vertical wall 17 extending downward from a laterally outward edge of the roof flange 16, an inclined wall 18 extending obliquely outward from an lower edge of the vertical wall 17, and a door flange 19 protruding from an lower edge of the inclined wall 18 toward the opening for the side door 10. The roof flange 16 of the rail inner panel 8 is designed to have a width (in the lateral direction) greater than that of the roof flange 14 of the rail outer panel 7, so that a root edge (or outwardmost edge) of the roof flange 16 of the rail inner panel 8 is located at a position offset outward of the automobile body by a distance A relative to a root edge (or outwardmost edge) of the roof flange 14 of the rail outer panel 7.

The rail reinforcement 9 has a reinforcement body 20 extending approximately parallel to the door-facing wall 11 and the arc-shaped wall 12 of the rail outer panel 7 with a given distance therebetween, a roof flange 21 sandwiched between the respective roof flanges 14, 16 of the rail outer panel 7 and the rail inner panel 8 and spot-welded together, and a door flange 22 sandwiched between the respective door flanges 15, 19 of the rail outer panel 7 and the rail inner panel 8 and spot-welded together.

The vertical wall 17 of the rail inner panel 8 is formed with an insertion hole for a fastening bolt 23 for fastening the shade support member 6 to the rail inner panel 8, and a nut 24 threadingly engageable with a threaded shank of the fastening bolt 23 is pre-fixed onto an outward surface of the vertical wall 17 by welding or the like. The joined door flanges 15, 19, 22 of the roof side rail 1 is designed to mount a weather strip 25 adapted to be brought into contact with an inward surface of the upper edge of the side door 10 so as to prevent wind, rainwater or the like from getting into the passenger compartment.

The shade support member 6 has an anchor portion 26 adapted to be fixed to the vertical wall 17 of the rail inner panel 8 by the fastening bolt 23, and a protrusion portion 27 protruding from an upper edge of the anchor portion 26 in the inward direction of the automobile body. For example, the shade support member 6 is an extrusion-molded product made of aluminum and formed to have an approximately reverse-L shape in section. The protrusion portion 27 of the shade support member 6 has a horizontal plate serving as a mounting segment 29 adapted to mount an upper edge (roof edge) of a front pillar trim member (not shown) or a roof side trim member 28 which is to be attached along an inward wall surface of the roof side rail 1, and a support groove 30 for slidably supporting a laterally outward edge of the sun shade 5. The support groove 30 is formed above the mounting segment 29 and in a sectionally U shape having an opening oriented in the laterally inward direction.

The protrusion portion 27 of the shade support member 6 is also formed with a contact segment 31 located above the support groove 30 and adapted to be brought into contact with the roof flange 16 of the rail inner panel 8 when the shade support member 6 is attached to the vertical wall 17 of the rail inner panel 8. The upper edge of the roof side trim member 28 is mounted to the mounting segment 29 by clamping a bracket 32 fixed to the upper edge of the roof side trim member 28 and the mounting segment 29 of the shade support member 6 together using a resin clip member 33.

Each of opposite lateral peripheral portions of the transparent roof panel 4 is adhesively fixed onto an upper surface of the roof flange 14 of a corresponding one of the rail outer panels 7. Specifically, an adhesive 34 is applied onto a bottom surface of the lateral peripheral portion of the transparent roof panel 4, and a flow restriction member 35 made, for example, of a sponge material, is fixed onto the lower surface on the inward side of the adhesive 34 to prevent flow of the adhesive 34. Then, the lateral peripheral portion of the transparent roof panel 4 is placed on the roof flange 14 with a given distance B between the laterally outward edge of the transparent roof panel 4 and the vertical wall 13 of the rail outer panel 7. In this manner, the lateral peripheral portion of the transparent roof panel 4 is fixed onto the upper surface of the roof flange 14 of the rail outer panel 7 by the adhesive 34 while preventing the adhesive 34 from flowing in the inward direction of the automobile body by the flow restriction member 35.

Figure 4:
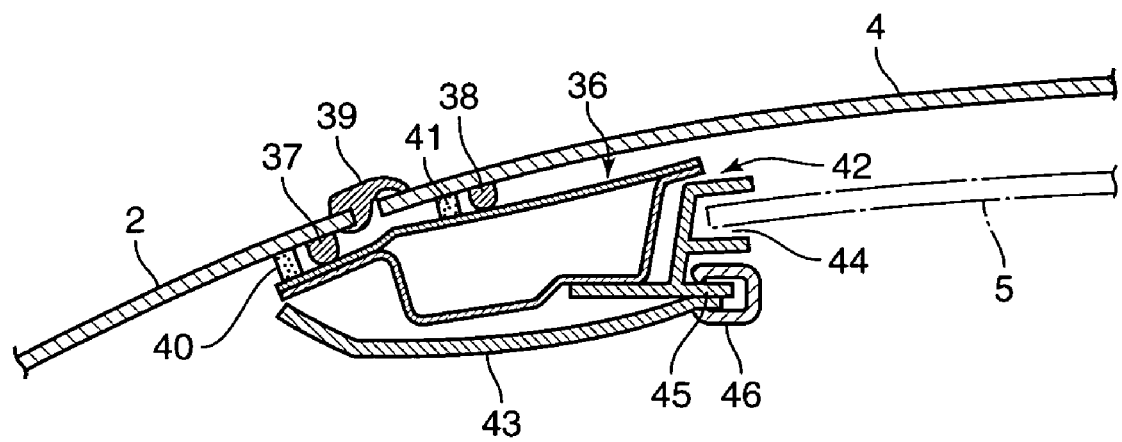
FIG. 4 is a sectional view taken along the line IV-IV in FIG. 1.

As shown in FIG. 4, the upper edge of the front windshield 2 and a front peripheral portion of the transparent roof panel 4 are fixed onto a top surface of a front header 36 disposed on the upper side at the front of the passenger compartment, by adhesives 37, 38, so that the front peripheral portion of the transparent roof panel 4 is disposed to be continuous with the upper edge of the front windshield 2. In FIG. 4, the reference numeral 39 indicates a weather strip for sealing between the front peripheral portion of the transparent roof panel 4 and the upper edge of the front windshield 2, and each of the reference numerals 40, 41 indicates a flow restriction member made, for example, of a sponge material, and adapted to prevent flow of a corresponding one of the adhesives 37, 38. The reference numeral 42 indicates a shade support member for supporting a front edge of the sun shade, and reference numeral 43 indicates a front header trim member for covering a bottom surface of the front header 36. The shade support member 42 is formed with a support groove 44 for the sun shade 5, and a mounting segment 45 for the front header trim member 43. The mounting segment 45 and an upper edge of the front header trim member 43 are clamped together by a resin clip member 46.

Figure 5:
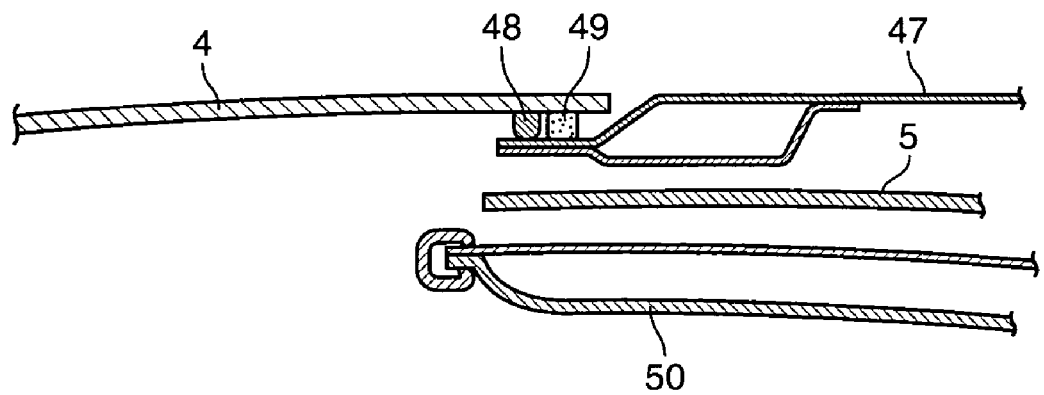
FIG. 5 is a sectional view taken along the line V-V in FIG. 1.

As shown in FIG. 5, by use of an adhesive 48, a rear peripheral portion of the transparent roof panel 4 is fixed onto an upper surface of a front portion of a rear roof panel 47 which is formed, for example, of a steel plate, and disposed to cover over an upper space of the rear of the passenger compartment. In FIG. 5, the reference numeral 49 indicates a flow restriction member made, for example, of a sponge material, and adapted to prevent flow of the adhesive 48, and the reference numeral 50 indicates a top sealing member for covering a bottom surface of the rear roof panel 47. A shade driving unit 51 is disposed on the rearward side of the automobile body in a space between the top sealing member 50 and the rear roof panel 47, and designed to slidingly move the sun shade 5 along the support groove 30 of the shade support member 6 between a frontward use or extended position and a rearward retracted position, as described in detail below.

Figure 6:
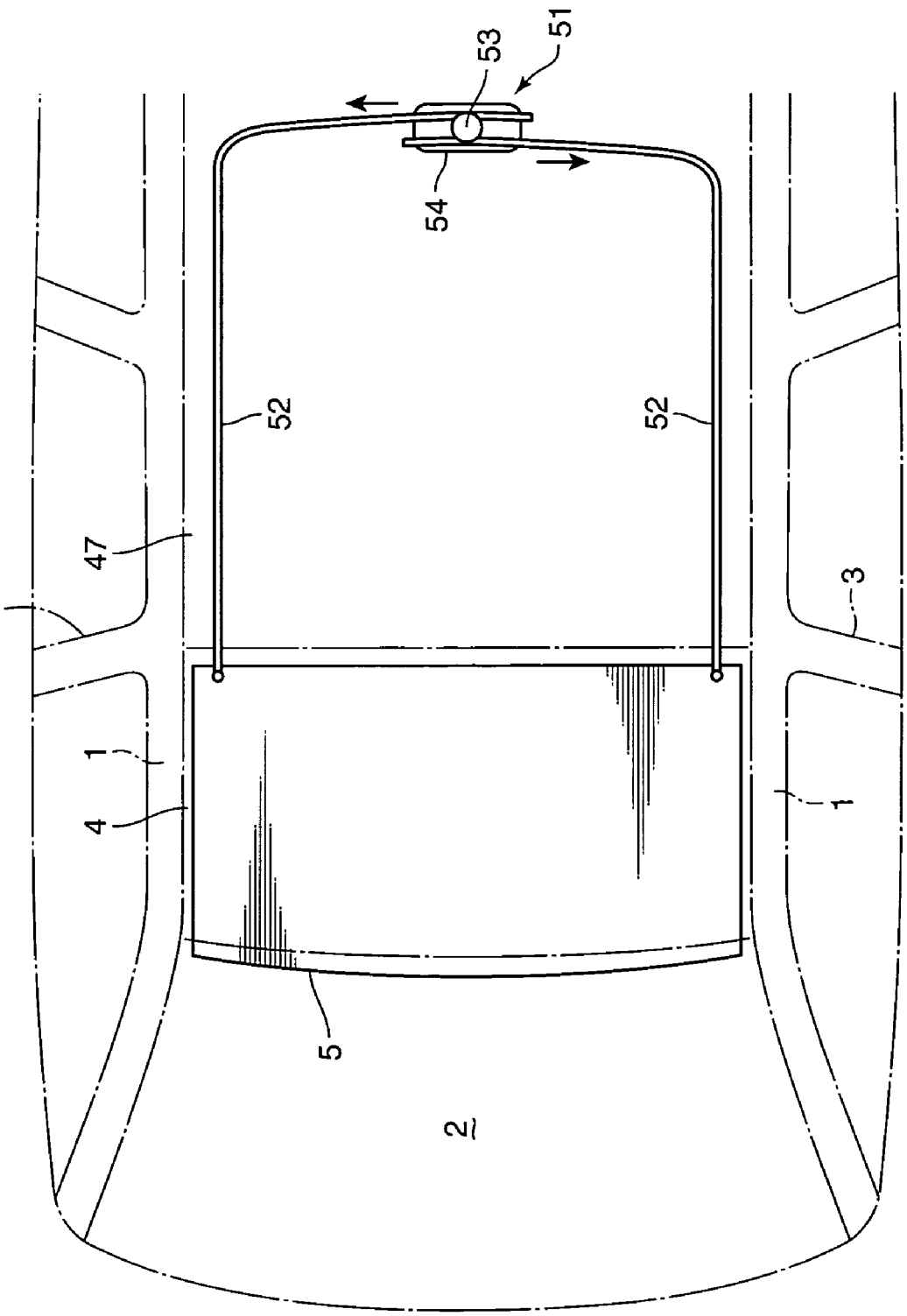
FIG. 6 is a top plan view showing the automobile roof structure according to the first embodiment, in a state after a sun shade is moved frontward.

As shown in FIGS. 1 to 6, the shade driving unit 51 comprises a pair of right and left driving cables 52 each extending rearward from a corresponding one of opposite laterally outward portions of a rear edge of the sun shade 5 and then extending from one lateral edge to the other lateral edge of the automobile body toward a distal end in an opposite relation to one another along a bottom surface of an rear edge of the rear roof panel 47, a pinion gear 53 engaged with an external thread formed in an outer peripheral surface of each of the driving cables 52, and a driving motor 54 for rotationally driving the pinion gear 53. When the driving motor 54 is activated to rotationally drive the pinion gear 53 in the direction indicated by each of the arrows in FIG. 1 or in a direction allowing the distal end of each of the driving cables 52 to be moved toward a corresponding one of the lateral edges of the automobile body, while guiding each of the driving cables 52 by a guide member (not shown), the sun shade 5 is moved rearward to the retracted position located below the rear roof panel 47, as indicated by the solid line in FIG. 3 and as shown in FIG. 5. When the pinion gear 53 is rotationally driven in the direction indicated by each of the arrows in FIG. 6 or in a direction allowing the distal end of each of the driving cables 52 to be moved toward the lateral center of the automobile body, the sun shade 5 is moved frontward to the use position for covering the bottom surface of the transparent roof panel 4, as indicated by the one-dot chain line in FIG. 3 and as shown in FIG. 6.

As above, the automobile roof structure according to the first embodiment comprises the pair of right and left roof side rails 1, the transparent roof panel 4 attached to cover a space between the roof side rails 1, the sun shade 5 disposed slidably along the bottom surface of the transparent roof panel 4, and the shade support member 6 for supporting the lateral edge of the sun shade 5 in a slidingly movable manner. The rail outer panel 7 and the rail inner panel 8 constituting each of the roof side rails 1 are combined together to define a closed section extending in the longitudinal direction of the automobile body. Further, the rail outer panel 7 and the rail inner panel 8 are formed, respectively, with the roof flange 14 and the roof flange 16 which are oriented to protrude in the laterally inward direction of the automobile body and joined together. Each of the opposite lateral peripheral portions of the transparent roof panel 4 is fixed onto the upper surface the roof flange 14 of a corresponding one of the rail outer panels 7, and the shade support member 6 is fixed to the wall of the rail inner panel 8 at a position outward of the automobile body relative to the roof flange 14 of the rail outer panels 7. Thus, the automobile roof structure according to the first embodiment has an advantage of being able to effectively increase a light-transmittable area in the roof portion of the passenger compartment so as to obtain excellent open feeling.

More specifically, as shown in FIG. 2, each of the opposite lateral peripheral portions of the transparent roof panel 4 is fixed onto the upper surface of the roof flange 14 constituting the rail outer panel 7 of a corresponding one of the roof side rails 1 disposed along the respective opposite lateral edges of the roof portions, by means of bonding or the like, and the shade support member 6 for supporting the sun shade 5 is fixed to the vertical wall 18 of the rail inner panel 8 located outward of the automobile body relative to the roof flange 14. Thus, the shade support member 6 and the roof flange 14 of the rail outer panel 7 can be disposed within a given positioning zone where they overlap one another in top plan view. This makes it possible to prevent the shade support member 6 from blocking passenger's upward view, and, for example, allow a range of the upward view C of a passenger seated in a driver's seat disposed on the right side of the automobile body to be increased in the lateral direction of the automobile body, so as to effectively provide enhanced open feeling in the passenger compartment.

Further, in the first embodiment, the root edge of the roof flange 16 formed in the rail inner panel 9 is disposed at a position offset outward of the automobile body relative to the root edge of the roof flange 14 formed in the rail outer panel 7. Thus, the vertical wall 17 of the rail inner panel 8 for mounting the shade support member 6 can be disposed on the laterally outward side of the automobile body without changing a shape of the rail outer panel 7 exposed to the outside of the automobile body. This makes it possible to reliably prevent the inward edge of the shade support member 6 from largely protruding in the inward direction of the automobile body relative to the roof flange 14, so as to sufficiently increase the light-transmittable area of the roof portion in the lateral direction of the automobile body to further effectively provide enhanced open feeling in the passenger compartment.

In the first embodiment, the shade support member 6 has the anchor portion 26 fixed to the rail inner panel 8 of the roof side rail 1, and the protrusion portion 27 protruding in the inward direction of the automobile body from the anchor portion 26. Further, the protrusion portion 27 is formed with the support groove 30 for supporting the lateral edge of the sun shade 5 in a slidingly movable manner. Thus, the automobile roof structure according to the first embodiment has an advantage of being able to firmly fix the anchor portion 26 to the rail inner panel 8 of the roof side rail 1 and stably support the lateral edge of the sun shade 5 by the support groove 30, while preventing the protrusion portion 27 from largely protruding in the inward direction of the automobile body relative to the roof flange 14.

Further, in the first embodiment, the shade support member 6 is formed with the flange contact segment 31 in contact with the roof flange 16 of the rail inner panel 8 so as to allow the shade support member 6 to be retained by two portions: a portion of the roof flange 16 with which flange contact segment 31 is in contact, and a portion of the vertical wall 18 to which the anchor portion 26 is fixed. Thus, the automobile roof structure according to the first embodiment has advantages of being able to ensure a sufficient retaining rigidity for the shade support member 6 and stably support the sun shade 5 by the support groove 30.

Particularly, in the first embodiment, the support groove 30 formed in the shade support member 6 has an upper wall in contact with the lower surface of the roof flange 16 of the rail inner panel 8 to serve as the flange contact segment 31. Thus, the automobile roof structure according to the first embodiment has advantages of being able to allow the shade support member 6 to be reliably retained by two portions: the anchor portion 26 formed in a lower position of the shade support member 6 and the flange contact segment 31 formed in an upper position of the shade support member 6, while preventing increase in size of the shade support member 6 as in the case where a flange contact segment is provided separately from the upper wall of the support groove 36.

In the first embodiment, the shade support member 6 is formed with the mounting segment 29 for mounting an edge of a front pillar trim member or the roof side trim member 28. Thus, the roof side trim member 28 or the front pillar trim member can be stably mounted in a simple and compact structure by utilizing the shade support member 6. In addition, the automobile roof structure according to the first embodiment has an advantage of being able to allow the roof side trim member 28 or the front pillar trim member to be disposed adjacent to the sun shade 5 so as to ensure a sufficient height of the passenger compartment and provide enhanced appearance of the passenger compartment.

While the first embodiment has been described in connection with one example where the front windshield 2 and the transparent roof panel 4 are formed as separate components, and arranged to be continuous with one another in the position of the front header 36, the present invention may be applied to a vehicle where a front windshield 2 covering the front of a passenger compartment and a transparent roof panel 4 covering an upper space of the passenger compartment are integrally formed as a single piece, and the front header 36 is omitted.

Figure 7:
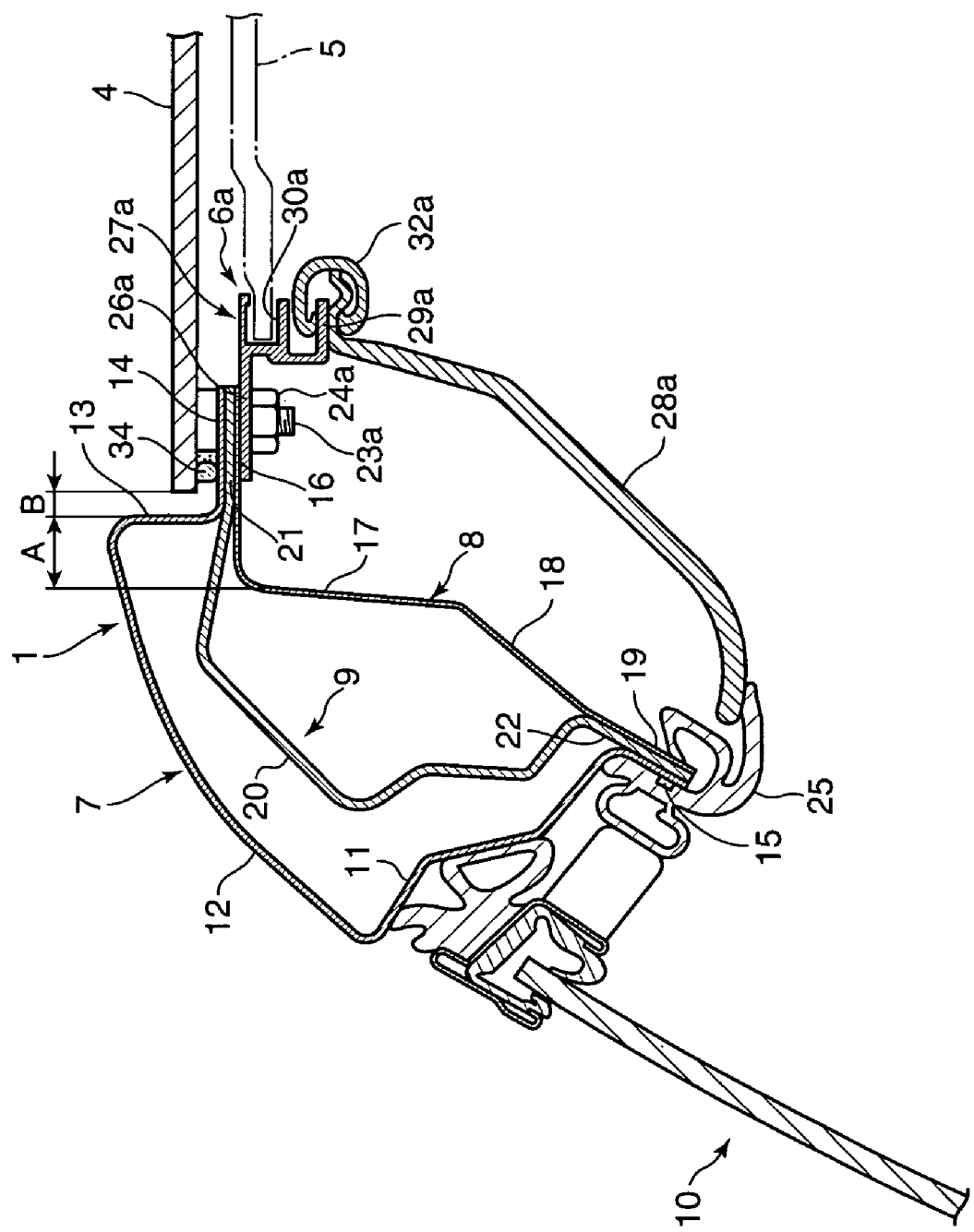
FIG. 7 is a sectional view showing an automobile roof structure according to a second embodiment of the present invention, which corresponds to FIG. 2.

FIG. 7 shows an automobile roof structure according to a second embodiment. In the second embodiment, each of the roof flanges 14, 16, 21 of the roof side rail 1 is formed with an insertion hole 23a for a fastening bolt 23a for fastening the transparent roof panel 4 to the roof side rail 1, and the roof flange 14 of the rail outer panel 7 has an application surface for the adhesive 34 for sealingly bonding the transparent roof panel 4 to the roof flange 14 at a position outward of the automobile body relative to a position of the fastening bolt 23a.

A shade support member 6a for supporting the sun shade 5 has an anchor portion 26a adapted to be fixed to the lower surface of the roof flange 16 of the rail inner panel 8, and a protrusion portion 27a protruding from the anchor portion 26a in the inward direction of the automobile body. For example, the shade support member 6a is an extrusion-molded product made of aluminum. The anchor portion 26a is formed with an insertion hole for the fastening bolt 23a. The protrusion portion 27a of the shade support member 6a has a support groove 30a formed in a sectionally U shape having an opening oriented in the laterally inward direction, and adapted to slidably support the laterally outward edge of the sun shade 5. Further, the protrusion portion 27a has a horizontal plate serving as a mounting segment 29a formed below the support groove 30a and adapted to mount an upper edge (roof edge) of a front pillar trim member (not shown) or a roof side trim member 28a which is to be attached along the inward wall surface of the roof side rail 1. The upper edge of the roof side trim member 28a is mounted to the mounting segment 29a of the shade support member 6a by clamping the upper edge of the roof side trim member 28a and the mounting segment 29a of the shade support member 6a together using a resin clip member 32a.

Each of opposite lateral peripheral portions of the transparent roof panel 4 is bonded onto an upper surface of the roof flange 14 of a corresponding one of the rail outer panels 7 through the adhesive 34, and fastened to the roof flanges 14, 16, 21 of the roof side rail 1 through the fastening bolt 23a, so that the roof flanges 14, 16, 21, the lateral peripheral portion of the transparent roof panel 4, and the shade support member 6a, are disposed within a given positioning zone where they overlap each other in top plan view, and each of the lateral peripheral portion of the transparent roof panel 4 and the shade support member 6a is fixed to the roof flanges 14, 16, 21 of the roof side rail 1.

More specifically, a head of the fastening bolt 23a is pre-fixed to a bottom surface of the lateral peripheral portion of transparent roof panel 4 by means of bonding or the like, and the adhesive 34 is applied onto the bottom surface on the outward side of the head of the fastening bolt 23a. In this state, the lateral peripheral portion of the transparent roof panel 4 is placed on the roof flange 14 with a given distance B between the laterally outward edge of the transparent roof panel 4 and the vertical wall 13 of the rail outer panel 7. Then, a threaded shank of the fastening bolt 23a is inserted through the respective insertion holes formed in the roof flanges 14, 16, 17 of the roof side rail 1 and the anchor portion 26a of the shade support member 6a, and a nut 24a is threadingly engaged with the threaded shank of the fastening bolt 23a, so that the roof flanges 14, 16, 21 of the roof side rail 1 and the anchor portion 26a of the shade support member 6a are sandwiched between the nut 24a and the head of the fastening bolt 23a, and the lateral peripheral portion of transparent roof panel 4 is fixed to the upper surface of the roof flange 14 through the fastening bolt 23a and the adhesive 34.

As above, in the automobile roof structure according to the second embodiment, the rail outer panel 7 and the rail inner panel 8 are formed, respectively, with the roof flanges 14, 16 oriented to protrude in the laterally inward direction of the automobile body and joined together. The roof flanges 14, 16, the lateral peripheral portion of the transparent roof panel 4, and the shade support member 6a, are disposed within a given positioning zone where they overlap each other in top plan view, and each of the lateral peripheral portion of the transparent roof panel 4 and the shade support member 6a is fixed to the roof flanges 14, 16 of the roof side rail 1. Thus, the automobile roof structure according to the second embodiment has an advantage of being able to stably retain the transparent roof panel 4 and the shade support member 6a in a simplified structure.

Specifically, both the transparent roof panel 4 and the shade support member 6a are fixed to a high-rigidity portion formed of the respective roof flanges 14, 16 of the rail outer panel 7 and the rail inner panel 8 superimposed on one another. Thus, the transparent roof panel 4 having a given weight and the shade support member 6a having a given load imposed during sliding movement of the sun shade 5 can be stably retained by the roof side rail 1 using a small number of components. Further, the transparent roof panel 4 and the shade support member 5 are disposed, respectively, on both sides of the roof flanges 14, 16 in the roof side rail 1, in adjacent relation to one another. Thus, the automobile roof structure according to the second embodiment has an advantage of being able to ensure a sufficient height of the passenger compartment without increasing a height of the automobile body. Furthermore, as mentioned above, the roof flanges 14, 16 of the roof side rail 1, the lateral peripheral portion of the transparent roof panel 4, and the shade support member 6a, are disposed within a given positioning zone where they overlap each other in top plan view. This makes it possible to prevent the shade support member 6a from blocking passenger's upward view so as to effectively provide enhanced open feeling in the passenger compartment.

Particularly, in the second embodiment, the rail reinforcement 9 is disposed between the rail outer panel 7 and the rail inner panel 8, and the rail reinforcement 9 is formed with the roof flange 21 sandwiched between the respective roof flanges 14, 16 of the rail outer panel 7 and the rail inner panel 8. Thus, the automobile roof structure according to the second embodiment has advantages of being able to effectively provide enhanced retaining rigidity for the transparent roof panel 4 and the shade support member 6a, and effectively suppress a distortion in the roof side rails 1 and the entire roof portion. This makes it possible to prevent the transparent roof panel 4 made of glass or the like from being damaged due to large distortion occurring in the roof portion, so as to stably retain the transparent roof panel 4 relative to the automobile body.

Further, in the second embodiment, the head of the fastening bolt 23a is fixed to the bottom surface of the transparent roof panel 4, and each of the roof flanges 14, 16, 21 of the roof side rail 1 and the anchor portion 26a of the shade support member 6a is formed with the insertion hole for the fastening bolt 23a. Then, the nut 24a is threadingly engaged with the threaded shank of the fastening bolt 23a inserted through the insertion holes to fasten the lateral periphery portion of the transparent roof panel 4 and the shade support member 6a to the roof flanges 14, 16, 21 of the roof side rail 1. Thus, the transparent roof panel 4 and the shade support member 6a can be fixed to the roof flanges 14, 16, 21 while accurately positioning them by the fastening bolt 23a. If a fastening member separated from the transparent roof panel 4 and the shade support member 6a is used for fastening them to the roof side rail 1, the fastening member is likely to protrude toward the passenger compartment to cause poor appearance and/or narrow passenger's upward visibility. The automobile roof structure according to the second embodiment has an advantage of being able to prevent occurrence of such a problem.

In the second embodiment, the application surface for the adhesive 34 for sealingly bonding the transparent roof panel 4 to the roof flange 14 at a position outward of the automobile body relative to a position of the fastening bolt 23a is formed in the roof flange 14 of the rail outer panel 7. Thus, the automobile roof structure according to the second embodiment has an advantage of being able to stably fix the transparent roof panel 4 using both the fastening bolt 23a and the adhesive 34 and to seal between the lateral peripheral portion of the transparent roof panel 4 and the roof flange 14 using the adhesive 34 so as to effectively prevent rainwater or the like from getting into the position of the fastening bolt 23a, in a simple manner. In addition, the transparent roof panel 4 can be stably retained relative to the roof side rail 1 while being positioned by a fastening force of the fasting bolt 23a. Thus, the automobile roof structure according to the second embodiment has an advantage of being able to effectively prevent occurrence of an undesirable situation where the transparent roof panel 4 is moved before the adhesive 34 becomes dry to cause deterioration in adhesive strength.

Figure 8:
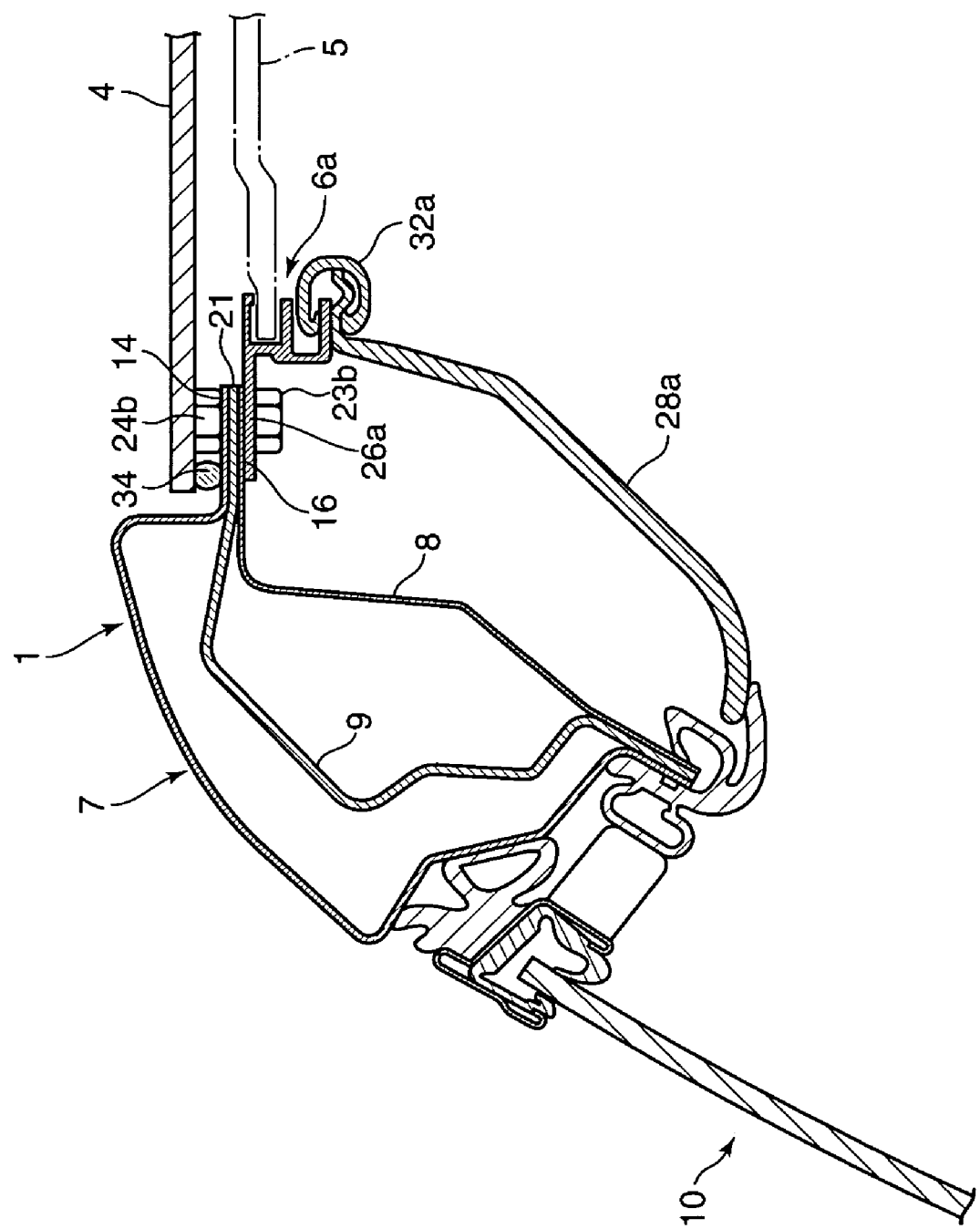
FIG. 8 is a sectional view showing an automobile roof structure according to a third embodiment of the present invention, which corresponds to FIG. 2.

Instead of the structure of the second embodiment where the head of the fastening bolt 23a is pre-fixed to the bottom surface of the transparent roof panel 4, an automobile roof structure according to a third embodiment of the present invention illustrated in FIG. 8 may be used. Specifically, a nut 24b adapted to be threadingly engaged with a fastening bolt 23b is pre-fixed to the bottom surface of the lateral periphery portion of the transparent roof panel 4. A threaded shank of the fastening bolt 23b is inserted from below and through the respective insertion holes formed in the roof flanges 14, 16, 21 of the roof side rail 1 and the anchor portion 26a of the shade support member 6a, and threadingly engaged with the nut 24b, so as to fix the lateral periphery portion of the transparent roof panel 4 and the anchor portion 26a of the shade support member 6a to the roof flanges 14, 16, 21 of the roof side rail 1.

Figure 9:
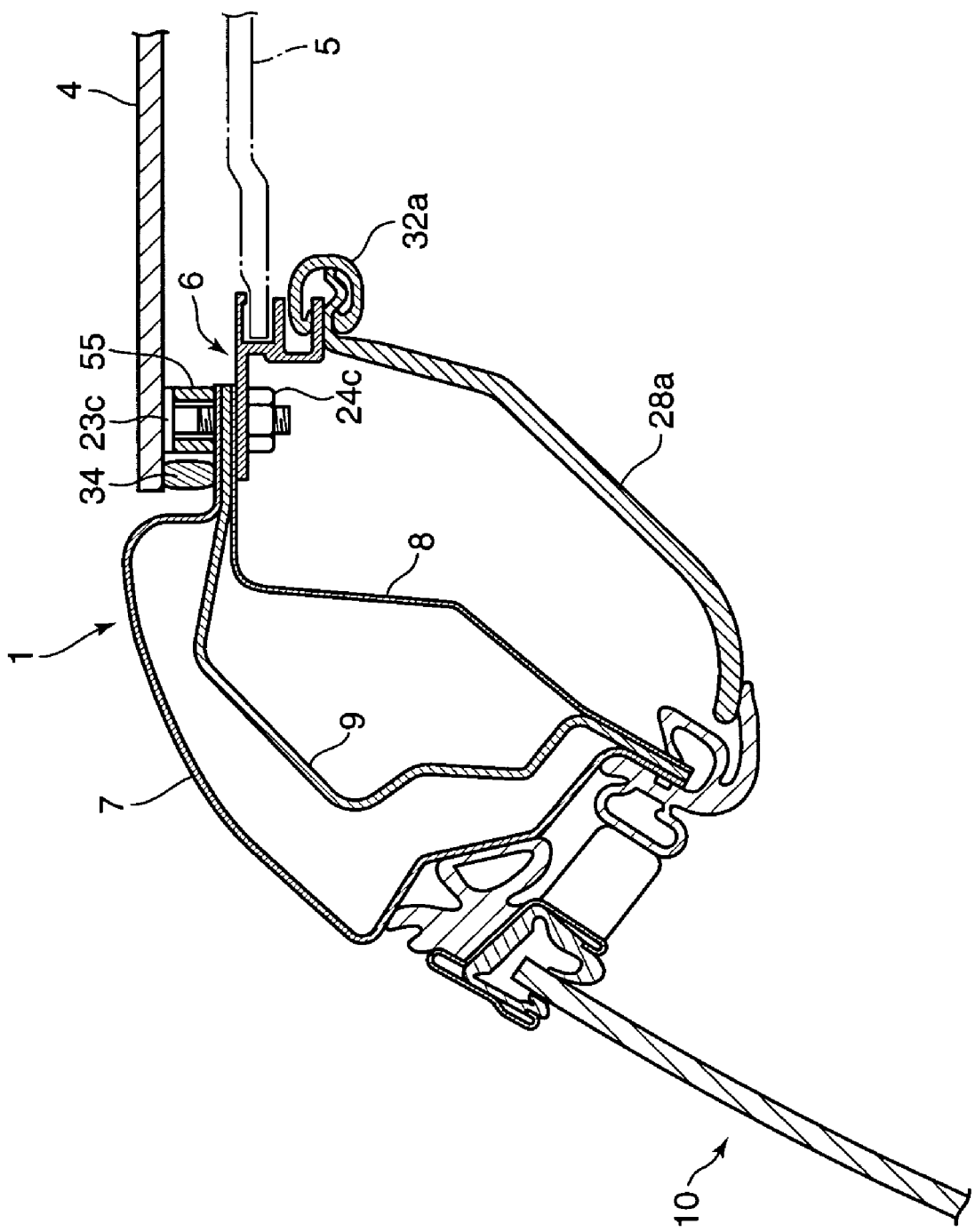
FIG. 9 is a sectional view showing an automobile roof structure according to a fourth embodiment of the present invention, which corresponds to FIG. 2.

Further, an automobile roof structure according to a fourth embodiment of the present invention illustrated in FIG. 9 may be used. In the fourth embodiment, a cylindrical-shaped collar 55 serving as a clearance control mechanism is combined with a fastening member consisting of the fastening bolt 23a and the nut 24 for fixing the transparent roof panel 4 to the roof flanges 14, 16, 21 of the roof side rail 1. The collar 55 is fitted onto the threaded shank of the fastening bolt 23c to keep a distance between the transparent roof panel 4 and the roof flanges 14, 16, 21 of the roof side rail 1. According to the fourth embodiment, the transparent roof panel 4 can fixed to the roof side rail while being positioned apart from the roof flange 14 of the rail outer panel 7 by a distance corresponding to a height of the collar 55 serving as the clearance control mechanism. This makes it possible to set a height of the transparent roof panel 4 at approximately the same level as the uppermost portion of the roof side rail 1 so as to provide enhanced appearance.

Figure 10:
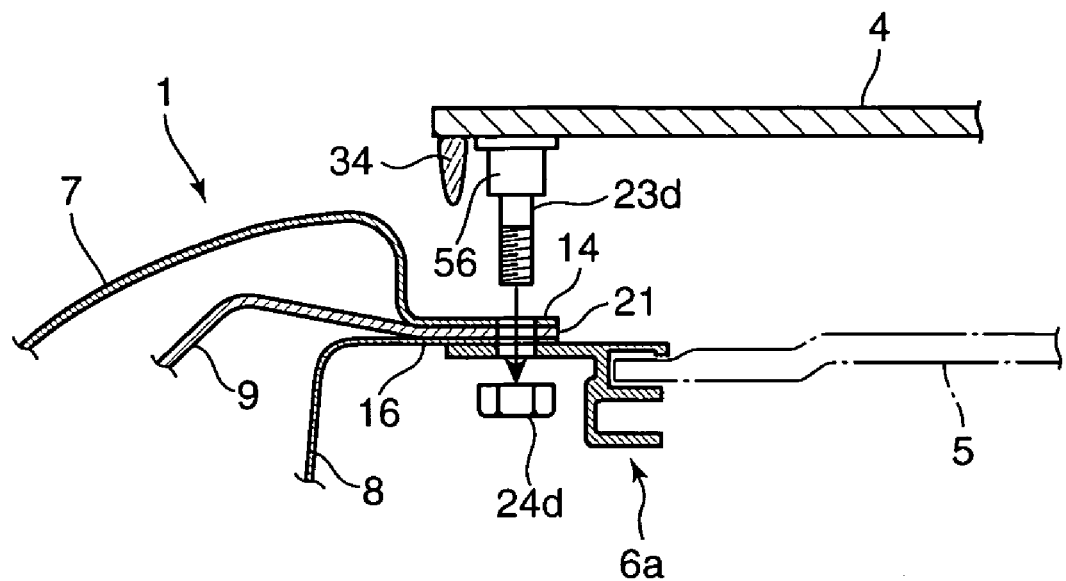
FIG. 10 is a sectional exploded view showing an automobile roof structure according to a fifth embodiment of the present invention.

Alternatively, an automobile roof structure according to a fifth embodiment of the present invention illustrated in FIG. 10 may be used. In the fifth embodiment, an enlarged portion 56 is formed in a threaded shank of a fastening bolt 23d to serve as the clearance control mechanism. A lower end face of the enlarged portion 56 is brought into contact with the upper surface of the roof flange 14, and then a nut 24d is threadingly engaged with the threaded shank of the fastening bolt 23d protruding downward from the roof flanges 14, 16, 21 of the roof side rail 1 to keep a distance between the transparent roof panel 4 and the roof flanges 14, 16, 21 of the roof side rail 1.

Figure 11:
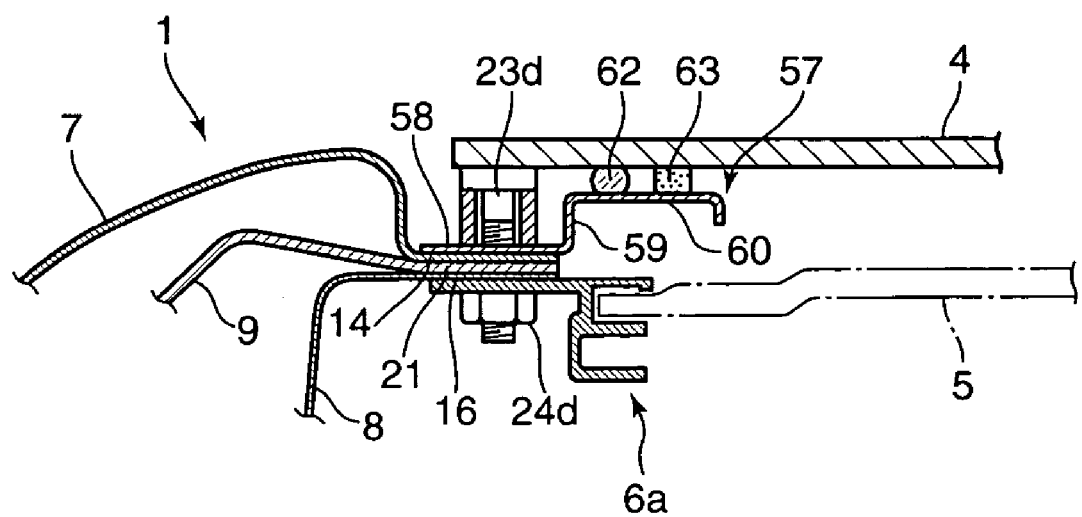
FIG. 11 is a sectional view showing an automobile roof structure according to a sixth embodiment of the present invention, which corresponds to FIG. 2.
Figure 12:
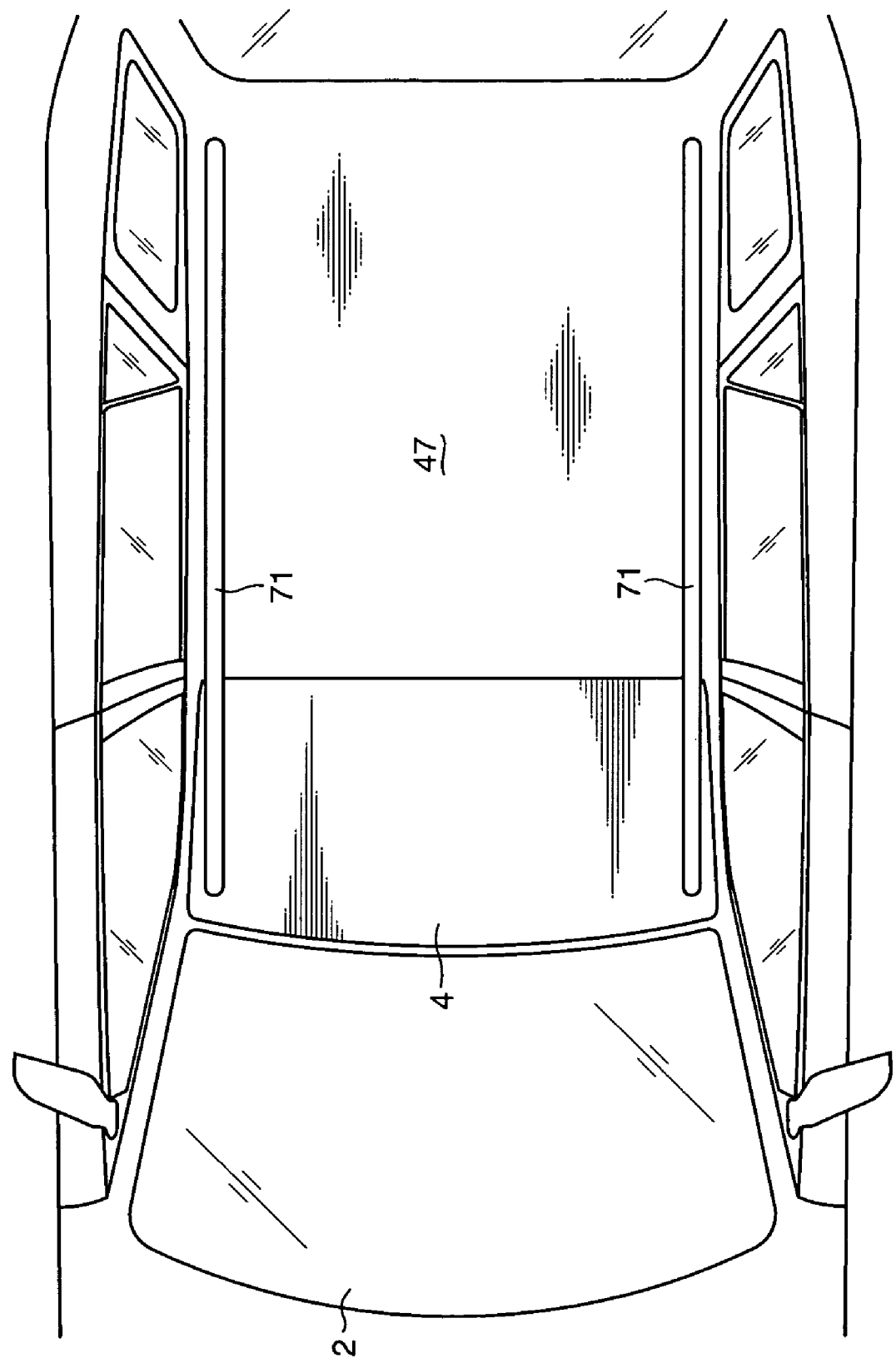
FIG. 12 is a top plan view showing an automobile roof structure according to a seventh embodiment of the present invention.
Figure 13:
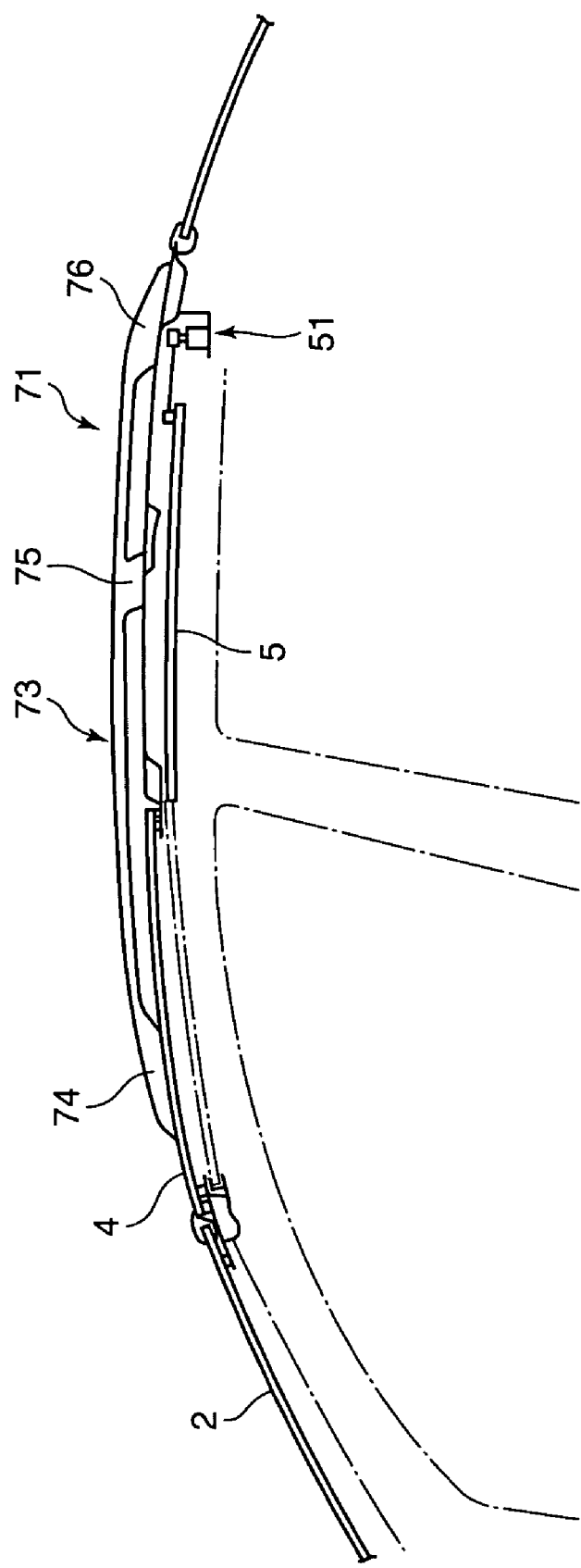
FIG. 13 is a sectional view showing the automobile roof structure according to the seventh embodiment, which corresponds to FIG. 3.

Alternatively, an automobile roof structure according to a sixth embodiment of the present invention illustrated in FIG. 11 may be used. In the sixth embodiment, an extension member 57 extending inward of the automobile body relative to the roof flanges 14, 16, 21 is attached to the roof side rail 1, and formed with a mounting portion 60 allowing the transparent roof panel 4 to be sealingly bonded thereto. Specifically, the extension member 57 has an anchor portion 58 fixed to the upper surface of the roof flange 14 of the rail outer panel 7 using a fixing member, such as the fastening bolt 23d, an upstand portion extending upward from an inward end of the anchor portion 58, and the mounting portion 60 protruding from an upper end of the upstand portion 59 in the inward direction of the automobile body. An adhesive is disposed between the bottom surface of the transparent roof panel 4 and a top surface of the mounting portion 60 to sealingly bond the lateral peripheral portion of the transparent roof panel 4 to the mounting portion 60 of the extension member 57. In FIG. 11, the reference numeral 63 indicates a flow restriction member made, for example, of a sponge material, and adapted to prevent flow of an adhesive 62.

In the sixth embodiment, the extension member 57 extending inward of the automobile body relative to the roof flanges 14, 16, 21 is attached to the roof side rail 1, and formed with the mounting portion 60 allowing the transparent roof panel 4 to be sealingly bonded thereto. This makes it possible to ensure a sufficient width of the mounting portion 60. Thus, automobile roof structure according to a sixth embodiment has an advantage of being able to stably fix the transparent roof panel 4 while sealing between the transparent roof panel 4 and the extension member 57 using the adhesive 62. Further, the mounting portion 60 of the extension member 57 may be formed as an uplifted portion located above the anchor portion. In this case, the transparent roof panel 4 can be fixed to the uplifted portion (mounting portion 60) using the adhesive 62 to set a height of the transparent roof panel 4 at approximately the same level as the uppermost portion of the roof side rail 1 so as to provide enhanced appearance.

FIG. 9 shows an automobile roof structure according to a seventh embodiment of the present invention. As shown in this embodiment, in an automobile equipped with a pair of roof racks 71 which are fixed, respectively, to right and left regions of a top surface of a roof portion of an automobile body, and oriented to extend in the longitudinal direction of the automobile body, the transparent roof panel 4 and the shade support member 6 may be fixed to the roof flanges 14, 16, 21 of the roof side rail 1 together with a corresponding of the roof racks 71 using a fastening bolt 72 for fixing the roof rack 71 to the roof flanges 14, 16, 21 of the roof side rail 1, as shown in FIGS. 14 and 15.

The roof rack 71 has a roof rack body 73 including an embedded core member 71a formed of a tube, such as steel pipe or aluminum pipe, and first to third legs 74 to 76 serving as brackets to be attached to the automobile body. As shown in FIG. 14, the first leg 74 located at a front end of the roof rack 71 includes a pair of fastening bolts 72 fixed thereto in longitudinally spaced-apart relation to one another. Each of the fastening bolts 72 has a head embedded in a lower end of the first leg 74, and a shank protruding downward from a bottom surface of the first leg 74. Each of the opposite lateral peripheral portions of the transparent roof panel 4 is formed with a pair of insertion holes 78 each adapted to fittingly receive therein a threaded shank of a corresponding one of the fastening bolts 72 and an upper portion 80 of a spacer 77 to be fitted onto the threaded shank of the fastening bolt 72.

The spacer 77 has a large-diameter lower portion 79 and the small-diameter upper portion 80 which are formed with a through-hole capable of being fitted on the threaded shank of the fastening bolts 72. The spacer 77 serves as the clearance control mechanism for keeping a distance between the transparent roof panel 4 and the roof flanges 14, 16. 21 of the roof side rail 1 in the operation for fixing the roof rack 71 and the transparent roof panel 4 to the roof flanges 14, 16. 21 of the roof side rail 1 using the fastening bolt 72.

Figure 14:
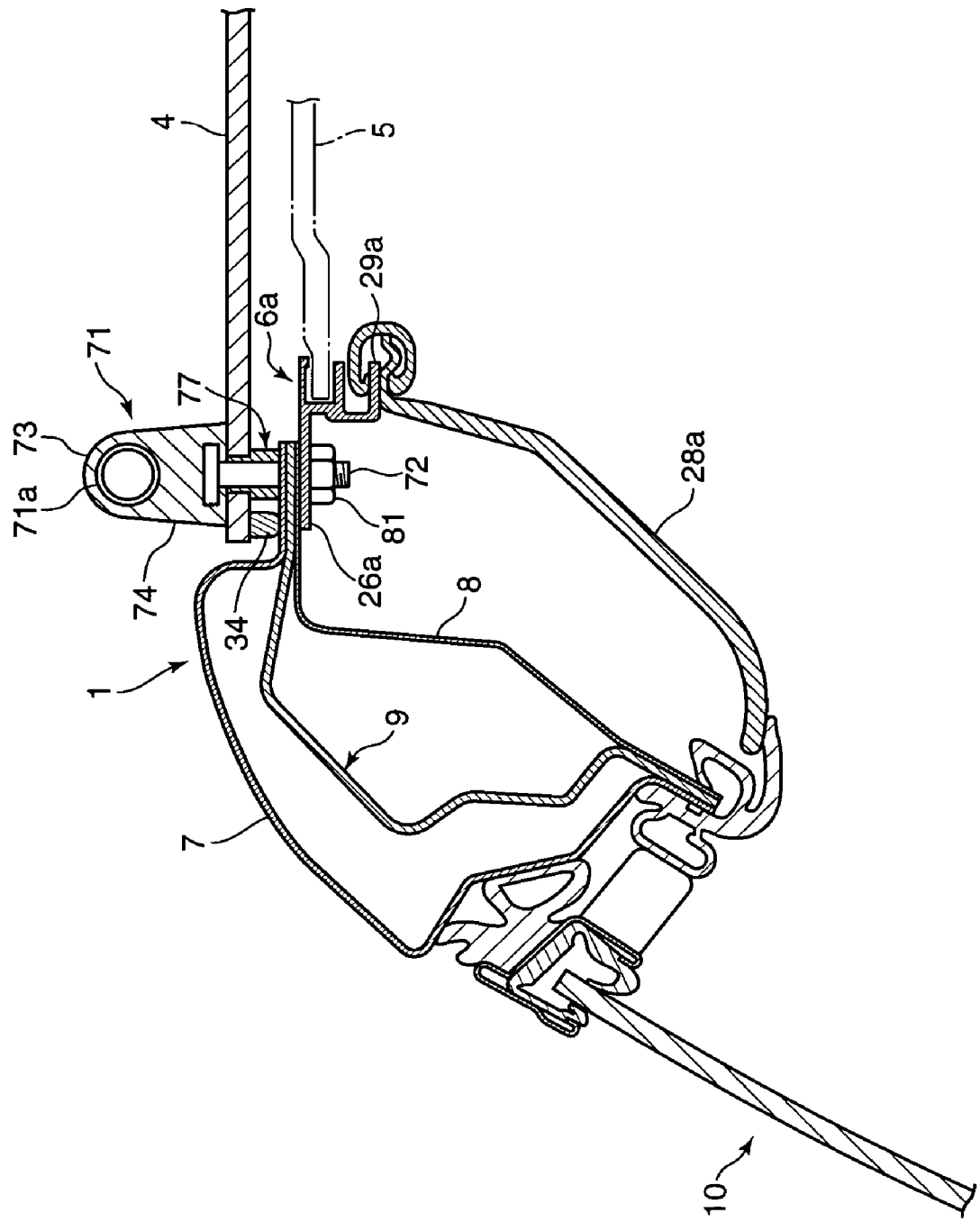
FIG. 14 is a sectional view showing the automobile roof structure according to the seventh embodiment, which corresponds to FIG. 2.
Figure 15:
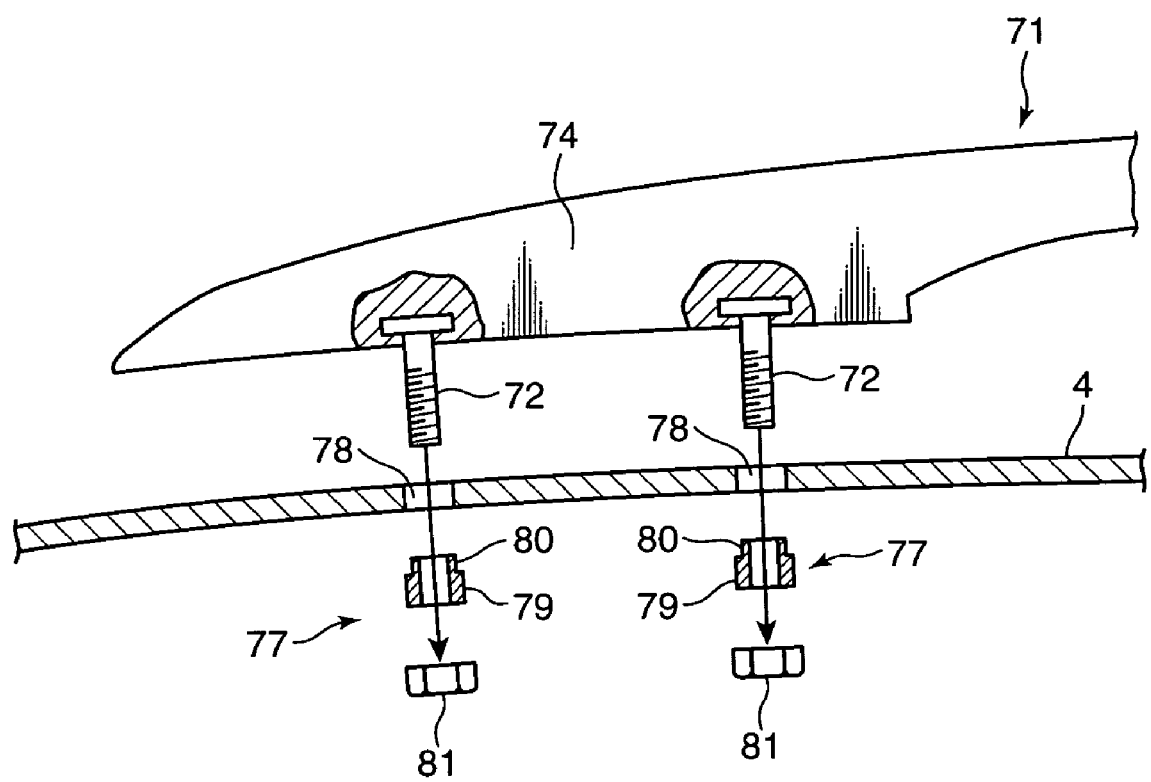
FIG. 15 is a sectional exploded view showing the structure of a roof rack mounting portion in the automobile roof structure according to the seventh embodiment.

Specifically, as shown in FIG. 14, in a process of inserting the threaded shank of the fastening bolt 72 through the insertion holes formed in the transparent roof panel 4 and the anchor portion 26a of the shade support member 6a, and threadingly engaging a nut 81 with the threaded shank of the fastening bolt 72, to sandwich the transparent roof panel 4, the roof flanges 14, 16. 21 of the roof side rail 1, and the anchor portion 26a of the shade support member 6a, between the nut 81 and the first leg 74 of the roof rack 71 so as to fasten them together, the upper portion 80 of the spacer 77 is fitted into the insertion hole 78 of the transparent roof panel 4, and a step between the upper portion 80 and the lower portion 79 of the spacer 77 is brought into contact with the bottom surface of the transparent roof panel 4 so as to keep the distance between the transparent roof panel 4 and the roof flanges 14, 16, 21 at a constant value.

As above, in the seventh embodiment, the transparent roof panel 4 and the shade support member 6 is fixed to the roof flanges 14, 16, 21 of the roof side rail 1 together with the roof rack 71 using the fastening bolt 72 for fixing the roof rack 71 to the roof flanges 14, 16, 21 of the roof side rail 1. Thus, the transparent roof panel 4 and the shade support member 6 can be stably fixed to the roof flanges 14, 16, 21 in a simplified structure. While a transparent roof panel 4 formed to avoid overlapping with positions of the roof racks is reduced in width or lateral length, the automobile roof structure according to the seventh embodiment has an advantage of being able to prevent occurrence of such a problem so as to ensure a sufficient light-transmittable area of the roof portion in the lateral direction of the automobile to provide enhanced open feeling in the passenger compartment. Further, in the operation for fastening the transparent roof panel 4 using the fastening bolt 72, the spacer 77 serving as the clearance control mechanism can keep a distance between the transparent roof panel 4 and the roof flanges 14, 16, 21 at a constant value. Thus, the automobile roof structure according to the seventh embodiment has an advantage of being able to effectively prevent the transparent roof panel 4 from being damaged due to excessive fastening force imposed on the transparent roof panel 4 made of a glass material or the like.

The automobile roof structure according to the seventh embodiment may be designed to keep a distance between the transparent roof panel 4 and the roof flanges 14, 16, 21 of the roof side rail 1 at a constant value by use of the spacer 77 serving as the clearance control mechanism, for example, adapted to be fitted onto the fastening bolt 72 for fixing the roof rack 71 and the transparent roof panel 4 to the roof flanges 14, 16, 21 of the roof side rail 1. In this case, the transparent roof panel 4 can be fixed to the roof side rail 1 while being positioned apart from the roof flange 14 of the rail outer panel 7 by a distance corresponding to a height of the clearance control mechanism such as the spacer 77. This makes it possible to set a height of the transparent roof panel 4 at approximately the same level as the uppermost portion of the roof side rail 1 so as to provide enhanced appearance.

Further, the transparent roof panel 4 may be sealingly bonded to the roof flange 14 at a position outward of the automobile body relative to the position of the fastening bolt 72 for fixing the transparent roof panel 4 to the roof flanges 14, 16, 21 of the roof side rail 1, as shown in FIG. 14. In this case, the transparent roof panel 4 can be stably fixed using both the fastening bolt 72 and the adhesive 34 and a sealing between the lateral peripheral portion of the transparent roof panel 4 and the roof flanges 14, 16, 21 can be performed using the adhesive 34 to effectively prevent rainwater or the like from getting into the position of the fastening bolt 72, in a simple manner. In addition, the transparent roof panel 4 can be stably retained relative to the roof side rail 1 while being positioned by a fastening force of the fasting bolt 23a. This provides an advantage of being able to effectively prevent occurrence of an undesirable situation where the transparent roof panel 4 is moved before the adhesive 34 becomes dry to cause deterioration in adhesive strength.

In sum, the present invention provides an automobile roof structure which comprises: a pair of right and left roof side rails each having a rail outer panel and a rail inner panel which are combined together to define a closed section extending in a longitudinal direction of an automobile body; a transparent roof panel attached to cover a space between the roof side rails; a sun shade disposed below a bottom surface of the transparent roof panel; and a shade support member for supporting the sun shade in a slidingly movable manner. In this automobile roof structure, the rail outer panel and the rail inner panel in each of the roof side rails are formed, respectively, with first and second roof flanges which are oriented to protrude in a laterally inward direction of the automobile body and joined together. Further, the first and second roof flanges, a corresponding one of opposite lateral peripheral portions of the transparent roof panel, and the shade support member, are disposed within a given positioning zone where they overlap each other in top plan view.

According to the present invention, the respective roof flanges of the rail outer panel and the rail inner panel, the lateral peripheral portion of the transparent roof panel, and the shade support member, are disposed to overlap each other in top plan view. This makes it possible to prevent occurrence of narrowed upward visibility which would otherwise be caused when the shade support member is disposed inward of the automobile body relative to the roof flanges, so as to increase a light-transmittable area of a roof portion in the lateral direction of the automobile body to effectively provide enhanced open feeling in a passenger compartment.

In the automobile roof structure of the present invention, each of the opposite lateral peripheral portions of the transparent roof panel may be fixed onto an upper surface of the first roof flange of the corresponding rail outer panel, and the shade support member may be fixed to a wall of the rail inner panel at a position located outward of the automobile body relative to the first flange of the rail outer panel.

The automobile roof structure according to the above first preferred embodiment has an advantage of being able to prevent an inward edge of the shade support member from largely protruding in the inward direction of the automobile body, so as to sufficiently increase the light-transmittable area of the roof portion in the lateral direction of the automobile body to further effectively provide enhanced open feeling in the passenger compartment.

In the automobile roof structure according to the first preferred embodiment, the second roof flange of the rail inner panel may have a root edge located at a position offset in an outward direction of the automobile body relative to a root edge of the first roof flange of the roof outer panel.

The automobile roof structure according to the above second preferred embodiment makes it possible to reliably prevent the inward edge of the shade support member from largely protruding in the inward direction of the automobile body, so as to sufficiently increase the light-transmittable area of the roof portion in the lateral direction of the automobile body to further effectively provide enhanced open feeling in the passenger compartment.

In the automobile roof structure according to the first preferred embodiment, the shade support member may have an anchor portion fixed to the rail inner panel, and a protrusion portion protruding in an inward direction of the automobile body from the anchor portion. Further, the protrusion portion is formed with a support groove for supporting a lateral edge of the sun shade in a slidingly movable manner.

The automobile roof structure according to the above third preferred embodiment has advantages of being able to effectively ensure a retaining rigidity for the shade support member fixed to the rail inner panel of the roof side rail while preventing the protrusion portion of the shade support member from largely protruding in the inward direction of the automobile body, and to stably support a lateral edge of the sun shade by the support groove formed in the protrusion portion.

In the automobile roof structure according to the third preferred embodiment, the shade support member may have a flange contact segment which is in contact with the second roof flange of the rail inner panel.

According to the above fourth preferred embodiment, the shade support member has the flange contact segment in contact with the second roof flange of the rail inner panel. This allows the shade support member to be retained by two portions: a portion of the second roof flange of the rail inner panel with which the flange contact segment is in contact, and a portion of the wall of the rail inner panel to which the anchor portion is fixed. Thus, the automobile roof structure according to the fourth preferred embodiment has advantages of being able to ensure a sufficient retaining rigidity for the shade support member and stably support the sun shade by the support groove.

In the automobile roof structure according to the fourth preferred embodiment, the support groove of the shade support member may have an upper wall in contact with a lower surface of the second roof flange of the rail inner panel to serve as the flange contact segment.

According to the above fifth preferred embodiment, the upper wall of the support groove formed in the shade support member is in contact with the lower surface of the second roof flange of the rail inner panel to serve as the flange contact segment. Thus, the automobile roof structure according to the fifth preferred embodiment has advantages of being able to allow the shade support member to be retained by two portions: the anchor portion of the shade support member and the flange contact segment as a part of the protrusion portion of the shade support member, while preventing increase in size of the shade support member as in the case where a flange contact segment is provided separately from the upper wall of the support groove.

In the automobile roof structure of the present invention, each of the opposite lateral peripheral portions of the transparent roof panel and the shade support member may be fixed, respectively, to the first and second roof flanges in a corresponding one of the roof side rails.

According to the above sixth preferred embodiment, both the transparent roof panel and the shade support member are fixed to a high-rigidity portion formed of the respective roof flanges of the rail outer panel and the rail inner panel superimposed on one another. Thus, the automobile roof structure according to the sixth preferred embodiment has an advantage of being able to allow the shade support member on which a given load is imposed during sliding movement of the sun shade to be stably retained by the roof side rail using a small number of components. Further, according to the above sixth preferred embodiment, the transparent roof panel and the shade support member are disposed, respectively, on both sides of the roof flanges in the roof side rail, in adjacent relation to one another. Thus, the automobile roof structure according to the sixth preferred embodiment has anther advantage of being able to ensure a sufficient height of the passenger compartment without increasing a height of the automobile body.

The automobile roof structure according to the sixth preferred embodiment may further include a rail reinforcement disposed between the rail outer panel and the rail inner panel. Further, the rail reinforcement may have a third roof flange sandwiched between the first roof flange of the rail outer panel and the second roof flange of the rail inner panel.

The automobile roof structure according to the above seventh preferred embodiment can effectively provide enhanced retaining rigidity for the transparent roof panel and the shade support member, and effectively suppress a distortion in the roof side rails and the entire roof portion to prevent the transparent roof panel from being damaged due to large distortion occurring in the roof portion, so as to stably retain the transparent roof panel relative to the automobile body.

The automobile roof structure according to the sixth preferred embodiment may further include a fastening bolt for fastening the transparent roof panel and the shade support member to the roof flanges of the roof side rail, and a nut engageable with the fastening bolt. In this case, either one of the fastening bolt and the nut may be fixed to the transparent roof panel, and each of the roof flanges and the shade support member may be formed with an insertion hole for the fastening bolt.

The automobile roof structure according to the above eighth preferred embodiment has an advantage of being able to fix the transparent roof panel and the shade support member to the roof flanges while accurately positioning them by the fastening bolt. If a fastening member separated from the transparent roof panel and the shade support member is used for fastening them to the roof side rail, the fastening member is likely to protrude toward the passenger compartment to cause poor appearance and/or narrow passenger's upward visibility. The automobile roof structure according to the eighth preferred embodiment has an advantage of being able to prevent occurrence of such a problem.

In the automobile roof structure according to the sixth preferred embodiment, when a pair of roof racks are fixed, respectively, to right and left regions of a top surface of a roof portion of the automobile body, and oriented to extend in the longitudinal direction of the automobile body, the automobile roof structure may further includes a fastening bolt for fastening each of the roof racks to the roof flanges in a corresponding one of the roof side rails, and a nut engageable with the fastening bolt. In this case, either one of the fastening bolt and the nut may be fixed to the roof rack. Further, the fastening bolt may have a threaded shank which penetrates through the lateral peripheral portion of the transparent roof panel, the roof flanges and the shade support member, and the nut may be engaged with the threaded shank. In this manner, the roof rack, the transparent roof panel and the shade support member can be fastened to the roof flanges of the roof side rail.

According to the above ninth preferred embodiment, both the transparent roof panel and the roof rack can be fastened to the roof flanges of the roof side rail by use of the fastening member consisting of the fastening bolt and the nut threadingly engaged with the threaded shank of the fastening bolt. Thus, as compared with a structure where the transparent roof panel and the roof rack are mounted to the roof side rail individually, the automobile roof structure according to the ninth preferred embodiment makes it possible to simplify the mounting structure and facilitate an assembling operation for the transparent roof panel and the roof rack. In addition, the roof rack, the transparent roof panel and the roof flanges of the roof side rail can be disposed within a given positioning zone where they overlap each other in top plan view to ensure a sufficient light-transmittable area of the roof portion in the lateral direction of the automobile body so as to provide enhanced open feeling in the passenger compartment.

The automobile roof structure according to the eighth or ninth preferred embodiment may further include a clearance control mechanism for keeping a distance between the transparent roof panel and the second roof flange of the rail inner panel at a constant value when the transparent roof panel is fasten to the roof flanges of the roof side rail by use of the fastening bolt.

According to the above tenth preferred embodiment, in an operation for fastening the transparent roof panel using the fastening bolt, the transparent roof panel can be positioned apart from the first roof flange of the rail outer panel by a distance corresponding to a height of the clearance control mechanism. This makes it possible to set a height of the transparent roof panel at approximately the same level as the uppermost portion of the roof side rail so as to provide enhanced appearance.

In the automobile roof structure according to the eighth or ninth preferred embodiment, the transparent roof panel may be sealingly bonded to the first roof flange of the rail outer panel using an adhesive, at a position located outward of the automobile body relative to a position of the fastening bolt disposed to fasten the transparent roof panel to the roof flanges of the roof side rail.

According to the above eleventh preferred embodiment, the transparent roof panel can be stably fixed using the fastening bolt and the adhesive, and the adhesive can seal between the lateral peripheral portion of the transparent roof panel and the first roof flange to effectively prevent rainwater or the like from getting into the position of the fastening bolt, in a simple manner. In addition, the transparent roof panel can be stably retained relative to the roof side rail while being positioned by a fastening force of the fasting bolt. Thus, the automobile roof structure according to the eleventh preferred embodiment has an advantage of being able to effectively prevent occurrence of an undesirable situation where the transparent roof panel is moved before the adhesive becomes dry to cause deterioration in adhesive strength.

In the automobile roof structure of the present invention, the shade support member may have a mounting segment for mounting an edge of a front pillar trim member or a roof side trim member.

According to the above twelfth preferred embodiment, the roof side trim member or the front pillar trim member can be stably mounted in a simple and compact structure by utilizing the shade support member. In addition, the automobile roof structure according to the twelfth preferred embodiment has an advantage of being able to allow the roof side trim member or the front pillar trim member to be disposed adjacent to the sun shade so as to ensure a sufficient height of the passenger compartment and provide enhanced appearance of the passenger compartment.

As above, according to the present invention, the shade support member and the first roof flange of the rail outer panel can be disposed within a given positioning zone where they overlap each other in top plan view, to prevent occurrence of narrowed upward visibility which would otherwise be caused when the shade support member is disposed inward of the automobile body relative to the roof flange, so as to increase the light-transmittable area of the roof portion in the lateral direction of the automobile body to effectively provide enhanced open feeling in the passenger compartment.

This application claims priority from Japanese Patent Application Serial Nos. 2005-140155, 2005-145250, and 2005-149775, filed in Japan Patent Office on May 12, May 18, and May 23, 2005, respectively, thus the entire contents of these Japanese Applications are incorporated by reference. Stated other way, it is deemed that the contents of aforementioned application constitutes part of this application.

Although the present invention has been described in term of specific exemplary embodiments, it will be appreciated that various changes and modifications may be made by those skilled in the art without departing from the spirits and scope of the invention, defined in the following claims.

What is claimed is:

1. An automobile roof structure comprising:
a pair of right and left roof side rails, each having a rail outer panel and a rail inner panel which are combined together to define a closed section extending in a longitudinal direction of an automobile body;
a transparent roof panel attached to cover a space between said roof side rails;
a sun shade disposed below a bottom surface of said transparent roof panel; and
a shade support member to support said sun shade in a slidingly movable manner
wherein the rail outer panel and the rail inner panel in each of said roof side rails are formed, respectively, with first and second roof flanges which are oriented to protrude in a laterally inward direction of the automobile body and joined together,
each of the opposite lateral peripheral portions of said transparent roof panel is fixed onto an upper surface of the first roof flange of the corresponding rail outer panel,
said first and second roof flanges, a corresponding one of opposite lateral peripheral portions of said transparent roof panel, and said shade support member, are disposed within a given positioning zone where they overlap each other in top plan view,
said shade support member is fixed to a wall of the rail inner panel at a position located outward of the automobile body relative to the first roof flange of said rail outer panel,
said shade support member has an anchor portion fixed to said inner panel, and a protrusion portion protruding in an inward direction of the automobile body from said anchor portion, said protrusion portion being formed with a support groove to support an lateral edge of said sun shade in a slidingly movable manner, and
said support groove of said shade support member has an upper wall in contact with a lower surface of the second roof flange of said rail inner panel.

2. The automobile roof structure according to claim 1, wherein the second roof flange of said rail inner panel has a root edge located at a position offset in an outward direction of the automobile body relative to a root edge of the first roof flange of said roof outer panel.

3. The automobile roof structure according to claim 1, wherein said shade support member has a flange contact segment which is in contact with the second roof flange of said rail inner panel.

4. The automobile roof structure according to claim 1, further comprising a fastening bolt,
wherein said shade support member is fixed to said wall of the rail inner panel by the fastening bolt.

* * * * *

UNITED STATES PATENT AND TRADEMARK OFFICE
CERTIFICATE OF CORRECTION

PATENT NO. : 7,393,047 B2 Page 1 of 1
APPLICATION NO. : 11/417184
DATED : July 1, 2008
INVENTOR(S) : Yasunari Hirotani et al.

It is certified that error appears in the above-identified patent and that said Letters Patent is hereby corrected as shown below:

Column 17, Line 22, after "manner" insert --,--.

Signed and Sealed this

Fourth Day of November, 2008

JON W. DUDAS
*Director of the United States Patent and Trademark Office*